United States Patent
Soliman et al.

(10) Patent No.: US 10,513,663 B2
(45) Date of Patent: Dec. 24, 2019

(54) GAS OIL SEPARATION PLANT SYSTEMS AND METHODS FOR RAG LAYER TREATMENT

(71) Applicant: SAUDI ARABIAN OIL COMPANY, Dhahran (SA)

(72) Inventors: Mohamed Soliman, Ras Tanura (SA); Khalid F. Alanazi, Dammam (SA); Samusideen Adewale Salu, Ras Tanura (SA); Talal A. Zahrani, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/866,100

(22) Filed: Jan. 9, 2018

(65) Prior Publication Data

US 2019/0211274 A1 Jul. 11, 2019

(51) Int. Cl.
| | | |
|---|---|---|
| *C10G 33/02* | (2006.01) | |
| *B01D 17/04* | (2006.01) | |
| *B03C 11/00* | (2006.01) | |
| *C10G 33/08* | (2006.01) | |
| *B01D 17/06* | (2006.01) | |

(52) U.S. Cl.
CPC ........... *C10G 33/02* (2013.01); *B01D 17/045* (2013.01); *B01D 17/06* (2013.01); *B03C 11/00* (2013.01); *C10G 33/08* (2013.01); *B03C 2201/02* (2013.01)

(58) Field of Classification Search
CPC ................................. C10G 33/02; B01D 17/06
See application file for complete search history.

(56) References Cited

U.S. PATENT DOCUMENTS

| | | | |
|---|---|---|---|
| 1,838,911 A | 12/1931 | Eddy | |
| 1,974,451 A | 9/1934 | Fisher | |
| 2,033,429 A | 3/1936 | Hanson et al. | |
| 2,033,567 A | 3/1936 | Worthington | |
| 2,045,465 A | 6/1936 | Hassler | |
| 2,830,957 A * | 4/1958 | Rhodes .................. | C10G 33/06 516/143 |
| 3,117,920 A | 1/1964 | Stenzel | |
| 4,180,457 A | 12/1979 | Popp et al. | |

(Continued)

FOREIGN PATENT DOCUMENTS

| | | | |
|---|---|---|---|
| AT | 390013 B | | 3/1990 |
| CN | 201581056 U | * | 9/2010 |

(Continued)

OTHER PUBLICATIONS

Cui et al., Machine Translation, CN 203187636 U. (Year: 2013).*

(Continued)

*Primary Examiner* — Brian W Cohen
*Assistant Examiner* — Ho-Sung Chung
(74) *Attorney, Agent, or Firm* — Bracewell LLP; Constance G. Rhebergen; Kevin R. Tamm

(57) ABSTRACT

Systems and methods for treating a rag layer in a gas oil separation plant. The method includes withdrawing the rag layer from a vessel proximate an oil water interface; conveying the rag layer to a separation device, the separation device operable to effect electrostatic coalescence on the rag layer to separate oil and water; and recycling separated oil from the separation device back to the gas oil separation plant process.

8 Claims, 5 Drawing Sheets

(56) References Cited

U.S. PATENT DOCUMENTS

| | | | |
|---|---|---|---|
| 4,257,895 A * | 3/1981 | Murdock | B01D 17/0211 |
| | | | 210/243 |
| 4,308,127 A | 12/1981 | Prestridge et al. | |
| 4,391,698 A | 7/1983 | Wagner | |
| 4,415,426 A | 11/1983 | Hsu et al. | |
| 4,702,815 A | 10/1987 | Prestridge et al. | |
| 5,861,089 A | 1/1999 | Gatti et al. | |
| 6,136,174 A | 10/2000 | Berry et al. | |
| 6,391,268 B1 * | 5/2002 | Berry | B03C 5/022 |
| | | | 204/284 |
| 8,790,509 B2 | 7/2014 | Vu | |
| 9,023,213 B2 | 5/2015 | Sams | |
| 9,238,183 B2 | 1/2016 | Sams et al. | |
| 2004/0094483 A1 * | 5/2004 | Mueller | B01D 17/00 |
| | | | 210/708 |
| 2008/0257739 A1 | 10/2008 | Sams et al. | |
| 2013/0026082 A1 | 1/2013 | Al-Shafei et al. | |
| 2013/0327646 A1 | 12/2013 | Sams et al. | |
| 2014/0202929 A1 * | 7/2014 | Mason | B01D 21/305 |
| | | | 208/298 |
| 2014/0251874 A1 | 9/2014 | Barroeta et al. | |
| 2015/0152340 A1 | 6/2015 | Cherney et al. | |
| 2015/0291456 A1 | 10/2015 | Findikoglu | |

FOREIGN PATENT DOCUMENTS

| | | | |
|---|---|---|---|
| CN | 203187636 U | * | 9/2013 |
| GB | 709626 | | 6/1954 |
| GB | 886908 | | 1/1962 |
| WO | 2010134822 A1 | | 11/2010 |

OTHER PUBLICATIONS

Liu et al., Machine Translation, CN 201581056 U. (Year: 2010).*
Related U.S. Appl. No. 15/399,591, filed Jan. 5, 2017.
Related U.S. Appl. No. 15/259,197, filed Sep. 8, 2016.
Davoust, Electrocoalescence Eau-Huile Emulsions: Versune, Dec. 31, 2011.
J. Eow, et al., Electrostatic Enhancement of Coalescence of Water Droplets in Oil: A Review of the Current Understanding, Chemical Engineering Journal 84, (2001) 173-172.
International Search Report and Written Opinion for related PCT application PCT/US2019/012639 dated Apr. 9, 2019.
ABB Gas Oil Separation Plant, found at http://wwww04.abb.com/global/seitp/seitp202.nsf/0/f8414ee6c6c6813f5548257c14001f11f2/$file/Oil+and+gas+production+handbook.pdf (2013).

* cited by examiner

GAS OIL SEPARATION PLANT SYSTEMS AND METHODS FOR RAG LAYER TREATMENT

BACKGROUND

Field

The present disclosure relates to gas oil separation plant (GOSP) technology. In particular, the disclosure relates to the automated, in addition to or alternative to continuous, removal and treatment of the interface layer (rag layer) between oil and water in separation vessels for oil-water emulsions.

Description of the Related Art

In general, a GOSP is a continuous separation process used to refine crude oil, which includes a high pressure production trap (HPPT), a low pressure production trap (LPPT), a low pressure degassing tank (LPDT), a dehydrator unit, first and second stage desalting units, a water/oil separation plant (WOSEP), a stabilizer column, centrifugal pumps, heat exchangers, and reboilers. In a GOSP, vessel pressure is often reduced in several stages to allow for the controlled separation of volatile components, such as entrained vapors. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in prior art GOSP's, many stages and units are required. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications.

GOSP's are oftentimes operated to meet the following specifications for crude oil: (1) a salt concentration of not more than about 10 pound (lbs.) of salt/1,000 barrels (PTB); (2) BSW of not more than about 0.3 volume percent (V %); (3) $H_2S$ content (concentration) of less than about 60 ppm in either the crude stabilization tower (or degassing vessels in the case of sweet crude); and (4) a maximum RVP of about 7 pounds per square inch absolute (psia) and a maximum true vapor pressure (TVP) of about 13.5 psia at 130 degrees Fahrenheit (° F.).

Prior art GOSP systems also suffer from the following issues: transformer tripping and inefficient energy usage; off-specification crude oil production in terms of BSW and salt content; high operating costs required to meet the crude specifications; and inefficient human and manual operations. Certain prior art treatments are limited to treating crude oil with a low water cut (approximately 30% by volume), while water cut in certain emulsion layers can reach as high as about 85% for tight emulsions in heavy crude oil applications.

The oil and aqueous phases in GOSP desalters and dehydrators do not have clear boundaries. Instead, the two phases are typically separated by "rag" layers comprising brine and suspended solids emulsified with crude oil. Rag layers grow and consequently reduce the efficiency and effectiveness of the desalting and dehydrating processes in GOSP systems. To ensure good separation and to avoid contaminating the oil and water phases with contents of the rag layers, operators frequently check the interface level and manually open a recycle or drain valve to drain the rag layer (infrequently). In other circumstances, the operator increases the demulsifier injection by 25% to stabilize the operation and to meet the desired crude oil salt and water content specifications. Failure to control the rag layer can result in off-specification product in terms of salt content and BSW, because when the rag layer comes into contact with the electrical grids of the electrostatic electrodes of a dehydrator or desalter, this will cause short-circuiting and tripping of the transformers.

SUMMARY

Disclosed are systems and processes to continuously or discontinuously extract and treat, reduce, or prevent an emulsion rag layer frequently formed at oil-aqueous liquid interfaces within crude oil separation and treatment equipment, such as for example desalters, dehydrators, and wet crude oil tanks, such as low pressure degassing tanks. In some embodiments, the treatment is accomplished by continuously feeding a slip stream from an emulsion rag layer through a restricted orifice (RO) into a three-phase separation vessel or spool of pipe fitted with fully insulated electrostatic electrodes to break the emulsion. By enabling efficient control, reduction, and elimination of the rag layer in separation vessels such as for example dehydrators and desalters, the risk of transformer short-circuiting and tripping is reduced with respect to insulated electrostatic electrode grids in the vessels.

One objective is to reduce, limit, or prevent the growth of the emulsion rag layer in crude oil treatment vessels by continuously withdrawing a slip stream of the emulsion layer and treating it. Suitable insulated electrostatic electrodes are capable of handling up to 100% water cut without short circuiting, and this enhances the emulsion breaking capabilities. Limiting and treating the emulsion rag layer will avoid off-specification crude oil products and minimize demulsifier and wash water consumption. In embodiments of the disclosure, systems and methods enable the efficient control, reduction, in addition to or alternative to elimination of the rag layer. Embodiments of the disclosure can separate up to about 90% of the water content in the rag layer depending on operating temperature, crude type, electrostatic coalescers and demulsifier used, or alternatively up to about or greater than about 95% of the water content in the rag layer.

In some embodiments, targeted crude oil specifications include a salt content of not more than 10 lbs. of salt/1,000 barrels (PTB) and a BSW of not more than 0.3 volume percent. Continuously withdrawing and treating a rag layer from crude oil treatment units such as dehydrators and desalters using fully insulated electrostatic electrodes fitted inside a 3-phase separation vessel or spool of pipe includes the following advantages: processes are independent of the interface level measurement as it will limit the maximum interface level automatically by continuously withdrawing the liquid from the interface point; withdrawn liquids can be an emulsion, dry crude, or 100% water; embodiments of the systems and methods disclosed can handle 100% water, gas, or oil; embodiments of systems and methods are used to control the maximum water level inside units such as desalters and dehydrators to avoid arcing or short-circuiting and, consequently, off-specification crude oil.

In some embodiments, the level of growth of the rag layer is controlled by continuously removing the rag layer formed from a given vessel. Therefore, the interface level can be controlled without having to measure it because the layer is continuously removed. In some embodiments, the fluid is continuously withdrawn using differential pressure. Dehydrators and desalters typically operate at higher pressures than a separation vessel, such as for example a low pressure degassing tank (LPDT). The fluid inside the dehydrators and desalters can be continuously withdrawn using the differential pressure between greater pressure vessels, such as for example dehydrators, and lesser pressure vessels, such as for example a LPDT.

For example, a separation vessel operating pressure can be in the range of about 1 psig to about 10 psig, and a desalter operating pressure can be greater than about 35 psig, depending on the vapor pressure of the fluid inside the desalter. Crude oil fed to a desalter is required to be below its bubble point to ensure no free vapor is liberated in the process. Desalters are designed to be 'gas free,' since the presence of vapor in a high voltage field can cause arcing which in turn leads to more vapor formation. Desalters can operate at about 25 psig higher than the fluid vapor pressure to avoid vaporization inside the desalters and potential arcing. Ultimately, the rag layer is withdrawn using an emulsion skimmer inside the vessel.

The implementation of embodiments of systems and methods of the present disclosure will help avoid off-specification crude oil; reduce demulsifier chemical consumption and wash water consumption (lower operating cost); increase the capacity of existing desalters to de-bottleneck plant capacity; reduce the size for new desalter and dehydrators (lower capital cost); will be used to control the maximum water level inside desalters and dehydrators to avoid arcing or short-circuiting and consequently off-specification crude oil; minimize the dependency on liquid interface measurements to control the interface level; and minimize the dependency on operator to monitor the interface measurements to control the rag layer.

Embodiments described here withdraw more frequently or continuously the rag layer from GOSP units such as for example desalters and dehydrators at a controlled rate to maintain the interface level using a restricted orifice (RO) or a control valve in combination with reliable interface measurements, such as with a level indicator and controller (LIC) in addition to or alternative to a flow indicator and controller (FIC). LIC's as described herein can be used in combination with control valves in addition to or alternative to flow indicators and controllers. A rag layer stream can be fed into either or both a three phase separator vessel with fully insulated electrostatic electrodes inside to separate oil, gas, and water and a two phase vessel to aid in breaking the emulsion. In some embodiments, when the electrodes are 100% deactivated, this would indicate about 100% water cut from a slip stream intending to withdraw a rag layer, but instead only withdrawing water. Therefore, it could be used as indicator to troubleshoot/enhance the desalting process and control the water level.

The emulsion layers consists of water, oil, and solids. Subjecting the emulsion layer to high voltage electric field will result in water droplets being distorted into an elliptical shape, with positive charges accumulating at the end nearest the negative electrode of the external electric field, and negative charges at the end nearest the positive electrode. The drops become induced dipoles. Two adjacent droplets in the field will have an electrical attraction for one another. The negative end of one droplet is nearest the positive end of the neighboring droplet, so there is an attractive force between the two that tends to draw them together. This force is of sufficient magnitude to rupture the interfacial film between the droplets upon collision, and allows them to coalesce into one larger droplet. The resulting larger water droplets (globules), along with water-insoluble solids, settle to the bottom of a vessel or pipe.

Higher water levels will result in only water being withdrawn and the electrodes can be 100% de-activated. An operator, for example, can immediately respond by lowering the water level, or in other embodiments a de-activation signal from the electrodes will be used to control (open) a water level control valve to reduce the water level.

Therefore, disclosed herein is a method for treating a rag layer in a gas oil separation plant process, the method including the steps of withdrawing the rag layer from a vessel proximate an oil water interface; conveying the rag layer to a separation device, the separation device operable to effect electrostatic coalescence on the rag layer to separate oil and water; and recycling separated oil from the separation device back to the gas oil separation plant process. In some embodiments of the method, the step of withdrawing the rag layer from the vessel occurs in a vessel selected from the group consisting of: a low pressure production trap; a dehydrator; and a desalter. In certain embodiments, the separation device is selected from the group consisting of: a three-phase separation device equipped with fully insulated electrostatic electrodes and a spool of pipe equipped with fully insulated electrostatic electrodes.

In other embodiments, the step of withdrawing the rag layer from the vessel proximate an oil water interface includes withdrawing the rag layer from the vessel proximate an oily water interface skimmer. In some embodiments, the step of conveying the rag layer to a separation device includes the step of conveying the rag layer through a restricted orifice. In other embodiments, the step of withdrawing is continuous during operation of the gas oil separation plant process. Still in other embodiments, the step of withdrawing is controlled in part by a level indicator and controller in communication with the vessel and in communication with a control valve, the control valve in fluid communication with the vessel.

In certain embodiments, the method further comprises the step of discontinuing conveying the rag layer to the separation device when the separation device detects about 100% water being withdrawn from the vessel. Still other embodiments further include the step of increasing the pressure of the rag layer prior to the conveying step. And in other embodiments, the step of increasing the pressure includes the use of at least one of a turbocharger and a pump.

Additionally disclosed is a system for treating a rag layer in a gas oil separation plant process, the system including an outlet stream to withdraw the rag layer from a vessel proximate an oil water interface; a separation device, the separation device in fluid communication with the outlet stream and operable to effect electrostatic coalescence on the rag layer to separate oil and water; and a recycle line to recycle separated oil from the separation device back to the gas oil separation plant process. In some embodiments, the outlet stream is in fluid communication with at least one vessel selected from the group consisting of: a low pressure production trap; a dehydrator; and a desalter. In other embodiments, the separation device is selected from the group consisting of: a three-phase separation device equipped with fully insulated electrostatic electrodes and a spool of pipe equipped with fully insulated electrostatic electrodes.

In certain other embodiments, the vessel further comprises an oily water interface skimmer. Still in other embodiments, the outlet stream further comprises a restricted orifice. In yet other embodiments, the outlet stream effects continuous withdrawal from the vessel to the restricted orifice during the operation of the gas oil separation plant process. Still other embodiments include a level indicator and controller in communication with the vessel and in communication with a control valve, the control valve in fluid communication with the vessel via the outlet stream.

In certain embodiments, the system is operable to automatically discontinue conveying the rag layer to the separation device when the separation device detects about 100% water being withdrawn from the vessel. Still in other embodiments, a device to increase the pressure of the rag layer is included. In some embodiments, the device to increase the pressure of the rag layer is selected from the group consisting of: a turbocharger; a pump; and combinations of the same.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of systems and methods of gas oil separation plants for rag layer treatment, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

For purposes of the present disclosure, tight emulsion crude oil includes emulsions that occur in medium to heavy crude oils with American Petroleum Institute (API) numbers less than about 29. Crude oil specific gravity, along with API numbers, can be used as a measure of crude oil quality. Higher API values indicate lighter oils and, thus, a higher market value. Water cut in oil production refers to the total volume of water in the crude oil stream divided by the total volume of crude oil and water, or water cut percent=total volumetric flowrate of water/(volumetric flowrate of water+ volumetric flowrate of crude oil)*100. Water cut increases with oil and gas well age during continuous production of oil and gas wells. Water cut at the beginning of the well life can be around zero percent and can reach close to 100% by the end of the life of the well. "Wet" crude oil normally has more than about 0.3 volume percent of water while "dry" crude has less than 0.3 volume percent water.

Figure 1:
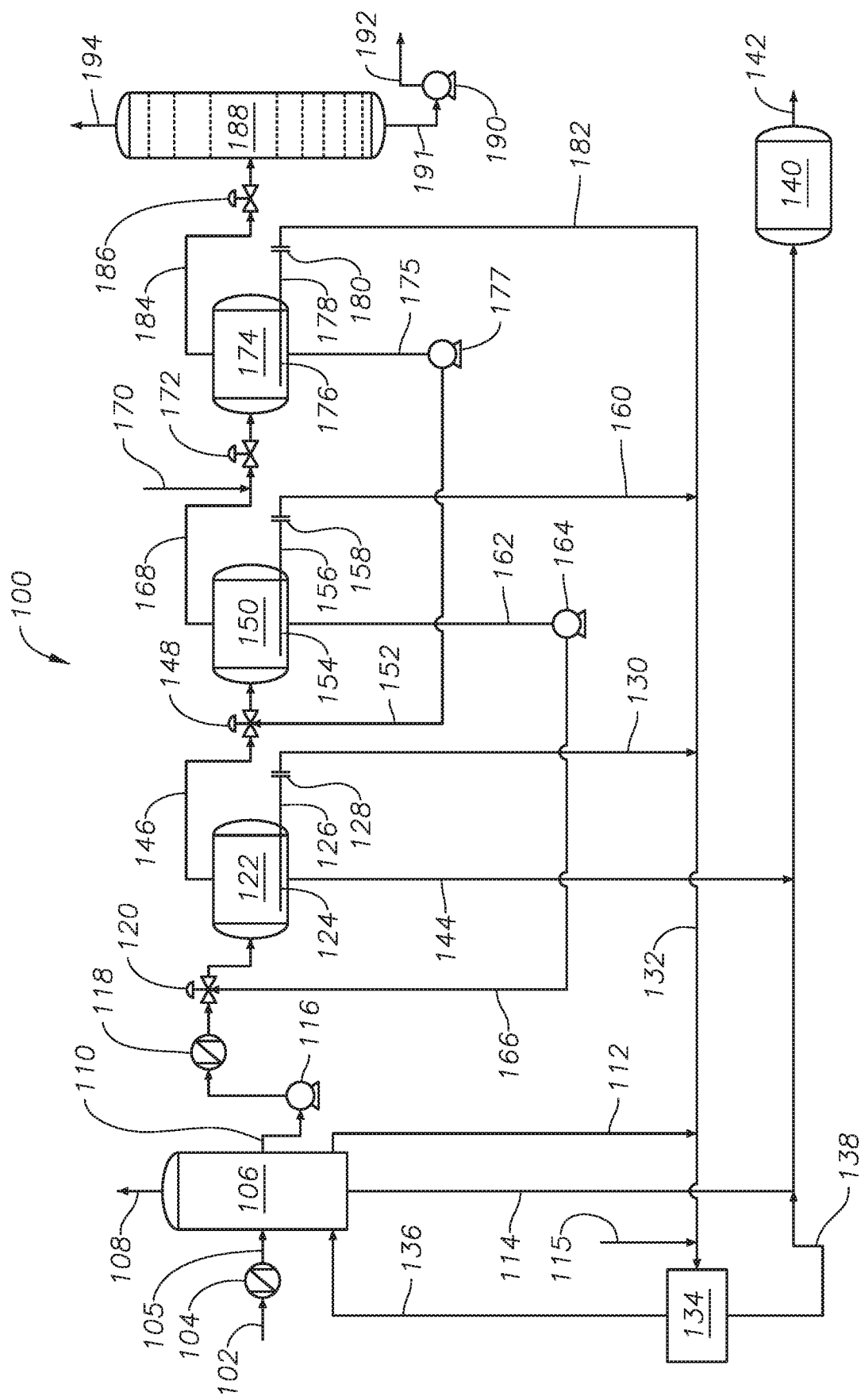
FIG. 1 is a flow diagram showing a gas oil separation plant (GOSP) applying continuous restricted orifice (RO) flow for rag layer (oil water interface) removal, along with insulated electrostatic electrodes inside a three-phase separation vessel.

Referring now to FIG. 1, a flow diagram is provided showing a gas oil separation plant (GOSP) applying continuous restricted orifice (RO) flow for rag layer (oil water interface) removal, along with insulated electrostatic electrodes inside a three-phase separation vessel. Crude oil from production traps (for example high pressure production traps (HPPT's)) enters GOSP system 100 at crude oil inlet 102 and proceeds to a wet dry crude oil heat exchanger 104 where it is heated before entering a low pressure degassing tank (LPDT) inlet stream 105 and LPDT 106. Pressure in LPDT 106 ranges from about 3 psig to about 10 psig, and LPDT 106 operating temperature ranges from about 55° F. to about 130° F. LPDT 106 outlets include off-gas stream 108 to release hydrocarbon gases, crude oil outlet stream 110, oily water outlet 112, and water outlet 114. Crude oil proceeds by crude oil outlet stream 110 to crude charge pumps 116, then to a trim heat exchanger 118, and a mixing valve 120 before entering a dehydrator 122. Dehydrator 122 includes an oily water interface skimmer 124 proximate the rag layer or interface between the oil and water within dehydrator 122. An oily water stream exits dehydrator 122 by oily water outlet stream 126 to a restricted orifice (RO) 128, and then proceeds via rag layer stream 130 to recycled rag layer stream 132. Oily water outlet 112 from LPDT 106 also joins recycled rag layer stream 132, other oil-in-water emulsion sources 115 can join recycled rag layer stream 132, and recycled rag layer stream 132 proceeds to a three-phase separation vessel with insulated electrostatic electrodes 134, to separate oil, water, and gases.

Interface skimmer location, such as for example oily water interface skimmer 124 proximate the rag layer or interface between the oil and water, can be provided by a vessel vendor, such as a dehydrator or desalter vendor, for example Baker Hughes of Houston, Tex., and the location can vary depending on the vessel type. The level of the skimmer can be adjustable in some embodiments, for example above an inlet feed, or below an inlet feed, or adjustable relative to the emulsion/rag layer. In some embodiments, electrical grids comprising electrostatic electrodes are in the oil phase within a vessel such as a desalter or dehydrator, which has lesser conductivity (greater resistance) than the aqueous phase.

An appropriate or suitable RO can be manufactured to meet the flow requirements for draining a rag layer. A RO is used instead of a standard pipe size because of the large pressure drop between a desalter or other processing vessel, such as a dehydrator, and the emulsion layer separation vessel and ultimately the LPDT. A correctly sized RO based on the differential pressure can provide the desired rag layer flow out of a processing vessel and to a separation vessel, and subsequently to a LPDT. Emulsion layer location is at the oil/water interface. A flow control valve can be used instead of an RO for increased flow control (see FIG. 2, for example). In some embodiments, an interface skimmer is fixed pipe with multiple open holes and does not move during operation of a vessel such as a desalter.

Three-phase separation vessel with insulated electrostatic electrodes 134 can have fed to it oil-in-water emulsions from a variety of sources, as shown in FIG. 1, and three-phase separation vessel with insulated electrostatic electrodes 134 separates oil and water (and optionally gas), oil being recycled by oil recycle line 136 to LPDT 106, and water being sent by water outlet stream 138 to water treatment unit 140 for eventual treated water disposal by treated water disposal line 142. Water outlet 114 from LPDT 106 and a water outlet 144 from dehydrator 122 also allow water from LPDT 106 and dehydrator 122 to proceed to water treatment unit 140 for eventual treated water disposal by treated water disposal line 142.

Insulated electrostatic electrodes can be similar to those of Wartsila Corporation of Helsinki, Finland produced under the term Vessel Internal Electrostatic Coalescers (VIEC). Another supplier of suitable electrodes would include Cameron International Corporation (a Schlumberger Company) of Houston, Tex.

Dehydrated oil from dehydrator 122 proceeds via dehydrated oil outlet stream 146 through mixing valve 148 to first stage desalter 150. At mixing valve 148, dehydrated oil outlet stream 146 is mixed with recycled wash water from recycled wash water stream 152. First stage desalter 150 includes an oily water interface skimmer 154 proximate the rag layer or interface between the oil and water within first stage desalter 150. An oily water stream exits first stage desalter 150 by oily water outlet stream 156 to a restricted orifice (RO) 158, and then proceeds via rag layer stream 160 to recycled rag layer stream 132. Recycled rag layer stream 132 proceeds to the three-phase separation vessel with insulated electrostatic electrodes 134. Water exits first stage desalter 150 by water outlet stream 162 and is recycled via pump 164 to recycled wash water line 166, where it is mixed at mixing valve 120 with crude oil from LPDT 106. Oil exits first stage desalter 150 at oil outlet stream 168 and is mixed with a wash water stream 170 (wash water stream 170 containing a lower concentration of salts than the crude oil exiting first stage desalter 150) at mixing valve 172.

Mixed oil and water enters second stage desalter 174. Second stage desalter 174 includes an oily water interface skimmer 176 proximate the rag layer or interface between the oil and water within second stage desalter 174. An oily water stream exits second stage desalter 174 by oily water outlet stream 178 to a restricted orifice (RO) 180, and then proceeds via rag layer stream 182 to recycled rag layer stream 132. Recycled rag layer stream 132 proceeds to the three-phase separation vessel with insulated electrostatic electrodes 134. Water exits second stage desalter 174 by water outlet stream 175 to pump 177 and enters mixing valve 148 by recycled wash water stream 152.

Dehydrated and desalted oil from second stage desalter 174 proceeds via oil outlet stream 184 through a depressurizing valve 186 to a crude oil stabilizer 188 for removal of volatile hydrocarbon compounds, before the stabilized, desalted, and dehydrated crude oil is pumped via crude shipping pumps 190 as a dry crude product through dry crude product stream 192. Volatile hydrocarbons exit crude oil stabilizer 188 by off-gas outlet stream 194. In the embodiment shown, crude oil stabilizer 188 does not have reboilers, but in other embodiments one or more reboilers can be applied.

In the embodiment of FIG. 1, continuous slip streams are withdrawn at the rag layer (interface between oil and water and possibly containing entrained sediment) from dehydrator 122, first stage desalter 150, and second stage desalter 174 by oily water outlet streams 126, 156, 178, respectively, through restricted orifices (RO)'s 128, 158, 180, respectively. Accurate interface level measurement is not mandatory to control the rag layer in the embodiment of FIG. 1. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively.

As the rag layer is removed from vessels for treatment to break the emulsion, formation of the rag layer is reduced, limited, or eliminated. Dehydrator 122, first stage desalter 150, and second stage desalter 174 operate at greater pressures than three-phase separation vessel with insulated electrostatic electrodes 134 and LPDT 106, and therefore the pressure differential across RO's 128, 158, 180 allow for natural flow of the rag layer from the dehydrator 122, first stage desalter 150, and second stage desalter 174 via continuous slip streams toward and into the three-phase separation vessel with insulated electrostatic electrodes 134 and LPDT 106. Once again, three-phase separation vessel with insulated electrostatic electrodes 134 helps break the emulsion of the rag layer via electrostatic coalescence.

Continuously withdrawing the rag layer prevents its growth and consequently controls the interface. In some embodiments, if the water level in vessels 122, 150, 174 rises and about 100% water was flowing to three-phase separation vessel with insulated electrostatic electrodes 134, the electrodes can be 100% deactivated if such a high concentration of water is detected or sensed.

In other embodiments, a flow control valve can be used instead of a RO for improved flow control. A flowmeter can be provided upstream of a control valve and receive its set point from the de-activation signals from the electrodes to stop flow of a slip stream from the rag layer level. A deactivation signal from the electrodes also can be used to control (open) a water level control valve to reduce the water level in a vessel to below an oily water interface skimmer, such that an oily water interface is proximate an oily water interface skimmer. In some embodiments, a flow control valve will set to continuously withdraw the rag layer at a laboratory estimated flow after conducting an emulsion test. This flow can increase gradually when all electrodes are not de-activated. In some embodiments, an oily water interface skimmer is a fixed pipe installed in the emulsion layer with a plurality of open holes to withdraw the rag layer across a vessel.

Figure 5:
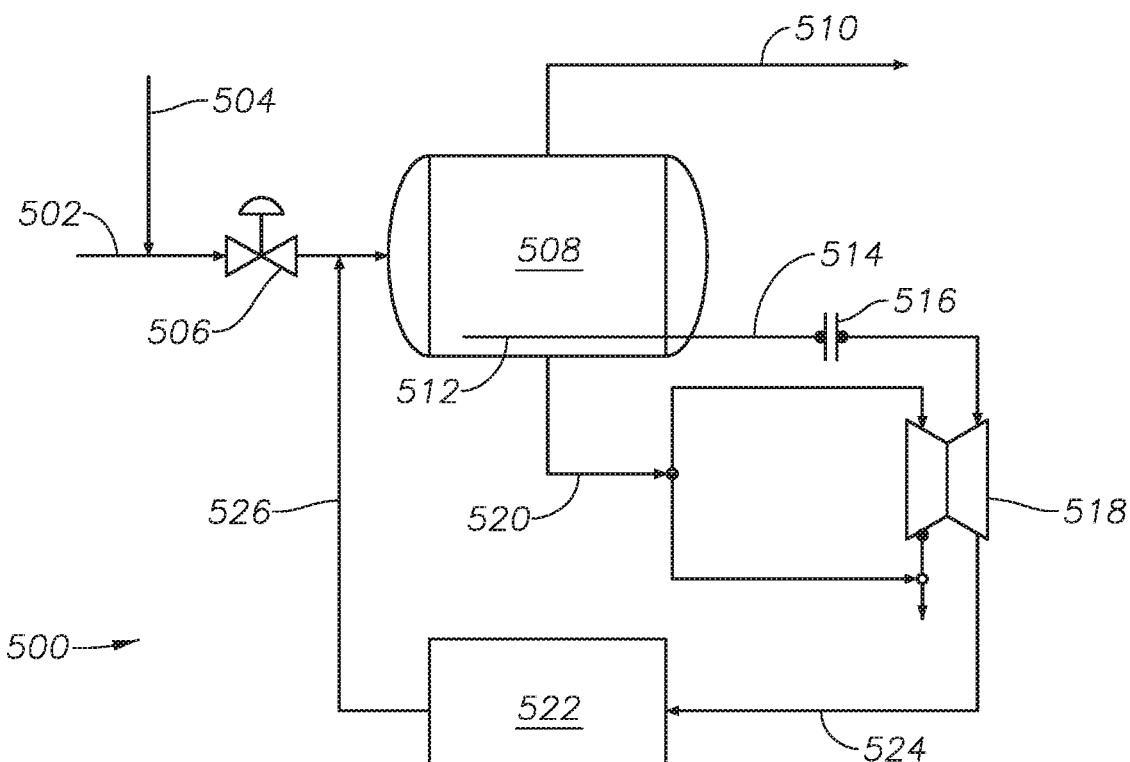
FIG. 5 is a flow diagram showing an example embodiment for treatment of a rag layer from a desalter using a turbocharger.
Figure 6:
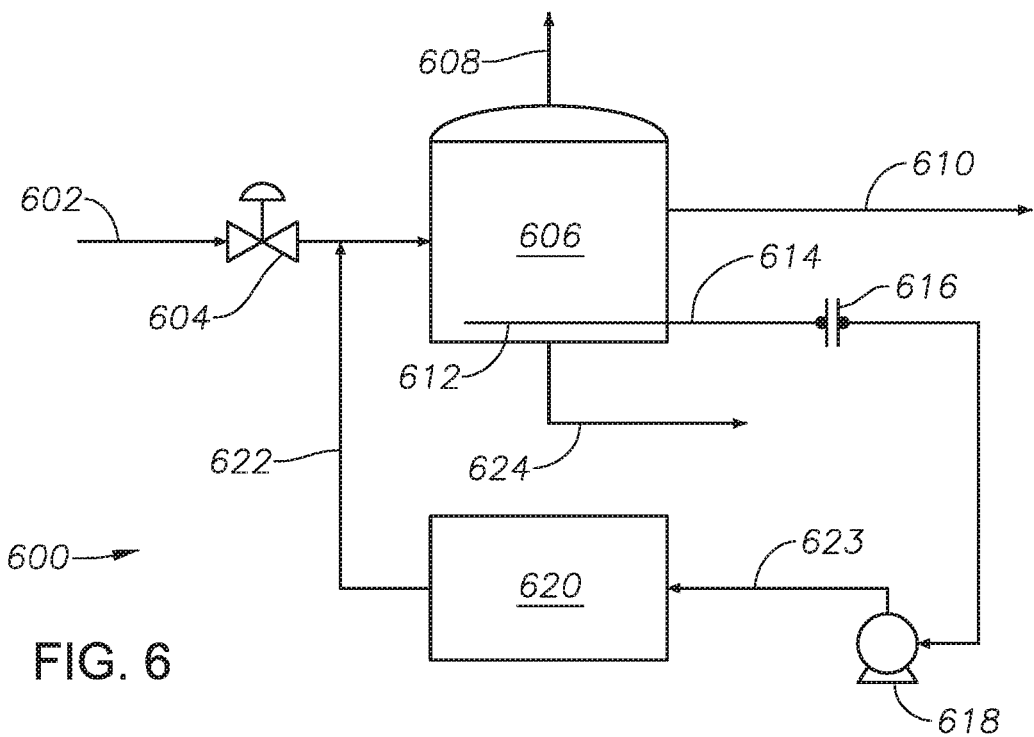
FIG. 6 is a flow diagram showing an example embodiment for treatment of a rag layer from a LPDT using a recycle pump.

In three-phase separation vessel with insulated electrostatic electrodes 134, insulated electrostatic electrodes are capable of handling up to 100% water cut, and the electrodes can be fully deactivated at about 100% water cut, which means only water is being withdrawn from dehydrator 122, first stage desalter 150, and second stage desalter 174, rather than a desired rag layer, or oil-in-water emulsion layer. While the embodiment of FIG. 1 shows oil from three-phase separation vessel with insulated electrostatic electrodes 134 being reintroduced to LPDT 106 by oil recycle line 136, oil could be reintroduced at other points, such as for example to dehydrator 122, first stage desalter 150, or second stage desalter 174, optionally with the use of a turbocharger in addition to or alternative to a recycle pump, as shown in FIGS. 5-6 and described as follows.

Figure 2:
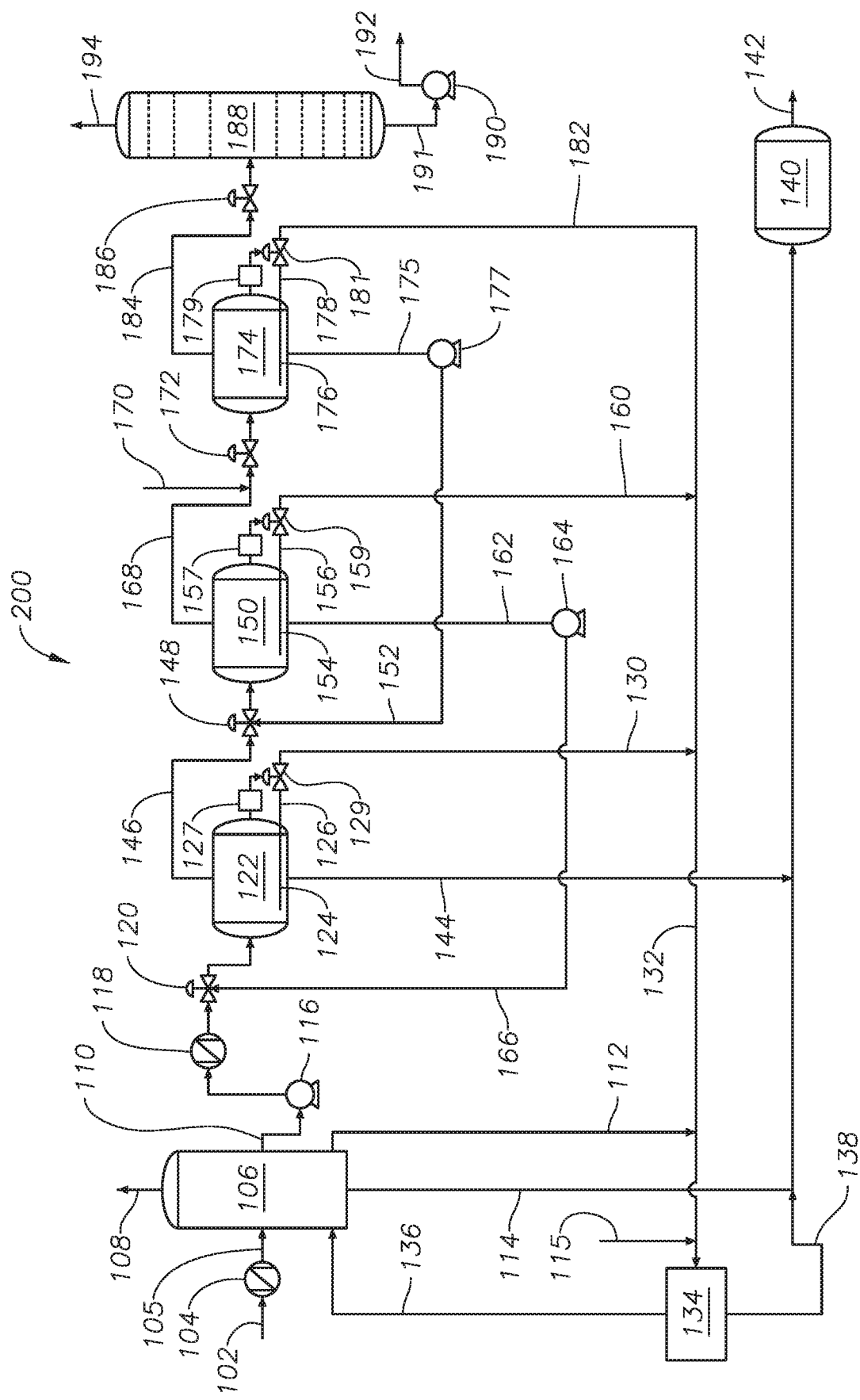
FIG. 2 is a flow diagram showing a GOSP applying controlled, continuous or discontinuous, automatic interface level control flow for rag layer (oil water interface) removal, along with insulated electrostatic electrodes inside a three-phase separation vessel.

Referring now to FIG. 2, a flow diagram is provided showing a GOSP applying continuous, or discontinuous, automatic interface level control flow for rag layer (oil water interface) removal, along with insulated electrostatic electrodes inside a three-phase separation vessel. Units labeled similarly to FIG. 1 are the same or similar units. As shown in FIG. 2, instead of restricted orifices (RO)'s 128, 158, 180 from FIG. 1, in FIG. 2 GOSP system 200 dehydrator 122 includes a level indicator and controller (LIC) 127 to control a control valve 129, first stage desalter 150 includes LIC 157 to control a control valve 159, and second stage desalter 174 includes LIC 179 to control a control valve 181. LIC's 127, 157, 179 can be used alternative to or in addition to flow indicators and controllers (FTC's). In dehydrator 122, first stage desalter 150, and second stage desalter 174, rag layers or the layer between oil and water in the vessels is withdrawn in a continuous, or discontinuous, manner under automatic interface level control instead of restricted flow as show in FIG. 1.

In three-phase separation vessel with insulated electrostatic electrodes 134, insulated electrostatic electrodes are capable of handling up to 100% water cut, and the electrodes can be fully deactivated at sensing or detecting 100% water cut, which means only water is being withdrawn from dehydrator 122, first stage desalter 150, and second stage desalter 174, rather than the desired rag layer, or oil in water emulsion layer. By testing, detecting, or sensing if the flow through three-phase separation vessel with insulated electrostatic electrodes 134 is about 100% water, operators or program logic can readjust, limit, increase, or change the location of the slip stream withdrawal from separation vessels such as dehydrator 122, first stage desalter 150, and second stage desalter 174. For example, if about 100% water was detected passing through three-phase separation vessel with insulated electrostatic electrodes 134, control valves 129, 159, 181 could be deactivated, or flow could be reduced but continued to avoid or reduce the formation of a rag layer in vessels 122, 150, 174.

Figure 3:
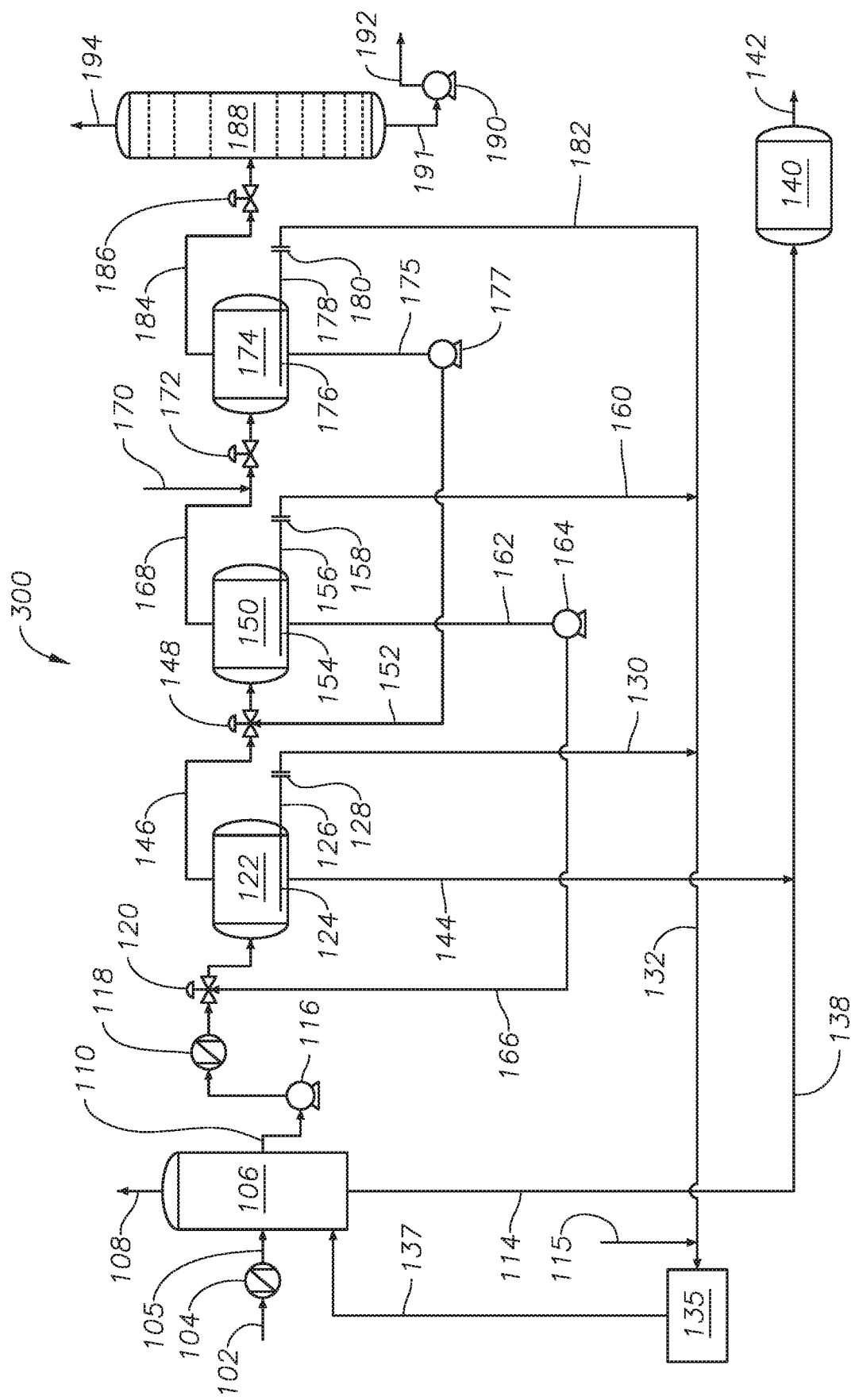
FIG. 3 is a flow diagram showing a GOSP applying continuous RO flow for rag layer (oil water interface) removal, along with insulated electrostatic electrodes inside a spool of pipe.

FIG. 3 is a flow diagram showing a gas oil separation plant (GOSP) applying continuous restricted orifice (RO) flow for rag layer (oil water interface) removal, along with insulated electrostatic electrodes inside a spool of pipe. Units numbered similarly to FIGS. 1 and 2 are the same or similar units. Similar to FIG. 1, in FIG. 3 GOSP system 300 uses RO's 128, 158, 180 in dehydrator 122, first stage desalter 150, and second stage desalter 174, respectively, to remove a continuous slip stream of the rag layer in the vessels proximate the oily water interface skimmers 124, 154, 176. Rather than a three-phase separator such as three-phase separation vessel with insulated electrostatic electrodes 134 shown in FIGS. 1 and 2, FIG. 3 includes a spool of pipe fitted with insulated electrostatic electrodes 135, and the whole treated rag layer is sent back to the LPDT 106 via stream 137. In other embodiments, a spool of pipe fitted with insulated electrostatic electrodes can be disposed in other locations of a GOSP system, such as for example GOSP system 300, and in other embodiments a spool of pipe fitted with insulated electrostatic electrodes can be used in addition to a three-phase separator (preceding or following), such as for example three-phase separation vessel with insulated electrostatic electrodes 134 shown in FIGS. 1 and 2.

In spool of pipe fitted with insulated electrostatic electrodes 135, when there is 100% water cut, the electrodes can be set to be 100% deactivated, as the layers being withdrawn from dehydrator 122, first stage desalter 150, and second stage desalter 174 are substantially all water, and do not include an oily water emulsion for treatment.

Regarding the difference between a three-phase separation vessel with insulated electrostatic electrodes versus a spool of pipe fitted with insulated electrostatic electrodes, a three phase separator will have a feed inlet, an oil outlet, a water outlet, and a gas outlet. The vessel will contain gas, and an oil-water emulsion. In a three phase vessel fitted with insulated electrostatic electrodes, the electrode elements will break the emulsion into crude oil and free water. The vessel is designed to provide enough residence time to separate the free water from the crude, for example between about 3 to about 5 minutes. Crude, and optionally gas, is then returned to a separation vessel, such as for example LPDT 106 shown in FIGS. 1 and 2.

However in a spool of pipe fitted with insulated electrostatic electrodes, the electrode elements will break the emulsion into free water and crude, but there is not complete physical separation inside the pipe of oil from water, as the residence time is less than that of a three-phase separation vessel, for example less than about 3 minutes. Instead, the separation of the water and crude after the spool of pipe fitted with insulated electrostatic electrodes will be completed in the downstream LPDT or any other downstream separation vessels.

Using a spool of pipe can be simpler, cheaper, and require less space. Free water will be separated in downstream equipment, such as for example a LPDT. In some embodiments, a flow rate through a spool of pipe fitted with insulated electrostatic electrodes is variable depending on emulsion breaking tests. Temperature can range from about 100° F. to about 312° F. for both a three-phase separation vessel with insulated electrostatic electrodes and a spool of pipe fitted with insulated electrostatic electrodes. Pressure will range from about 1 psig to about 15 psig for the three-phase separator, and for the spool of pipe pressure is above the bubble point pressure of the fluid for the spool pipe to prevent vaporization. For example, above about 100 psig or about 10 psig higher than the bubble point of the fluid in the spool of pipe.

Figure 4:
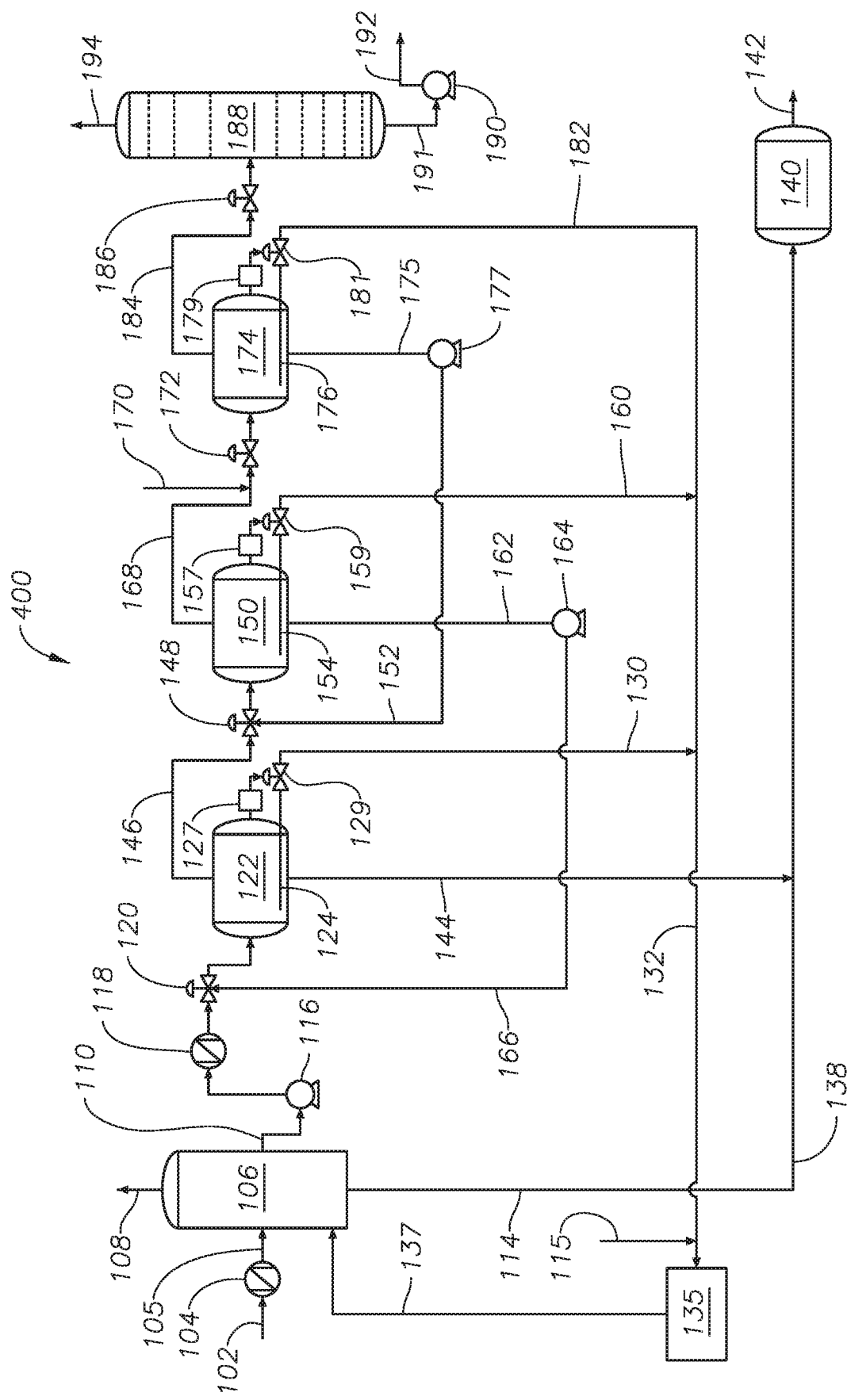
FIG. 4 is a flow diagram showing a GOSP applying controlled, continuous or discontinuous automatic interface level control flow for rag layer (oil water interface) removal, along with insulated electrostatic electrodes inside a spool of pipe.

Referring now to FIG. 4, a flow diagram is provided showing a gas oil separation plant (GOSP) applying continuous, or discontinuous, automatic interface level control flow for rag layer (oil water interface) removal, along with insulated electrostatic electrodes inside a spool of pipe. Similar to FIG. 2, in FIG. 4 GOSP system 400 uses LIC's 127, 157, 179 and control valves 129, 159, 181 with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's 127, 157, 179 can be used in addition to or alternative to flow indicators and controllers (FIC's).

Rather than a three-phase separator such as three-phase separation vessel with insulated electrostatic electrodes 134 shown in FIG. 2, FIG. 4 includes a spool of pipe fitted with insulated electrostatic electrodes 135, and the entire treated rag layer is sent back to the LPDT 106 via stream 137. In other embodiments, a spool of pipe fitted with insulated electrostatic electrodes can be disposed in other locations of a GOSP system, such as for example GOSP system 400, and in other embodiments a spool of pipe fitted with insulated electrostatic electrodes can be used in addition to a three-phase separator (preceding or following), such as for example three-phase separation vessel with insulated electrostatic electrodes 134 shown in FIG. 2.

In spool of pipe fitted with insulated electrostatic electrodes 135, when there is 100% water cut, the electrodes are set to be 100% deactivated, as the layers being withdrawn from dehydrator 122, first stage desalter 150, and second stage desalter 174 are all water, and do not include an oily water emulsion for treatment.

In embodiments of systems and methods of the present disclosure, one or more high pressure production traps (HPPT's) can precede LPDT's, and pressure in a HPPT can range from about 150 psig to about 450 psig depending on the crude oil supply pressure. Typically, wash water salinity ranges from about 100 ppm to about 12,000 ppm salt in embodiments of the present disclosure, for example in wash water stream 170. Wash water will be more effective at lower salinity. Formation water salinity inside crude oil can reach as high as 270,000 ppm of salt content. Demulsifiers, or emulsion breakers, are chemicals used to separate emulsions (for example oil-in-water emulsions). Some commercially available demulsifiers are Petrolite DMO-22241 by Baker Petrolite, Emulsotron CC-8948 by Champion Technologies, SUGEST 9005 by German Metal Surface Treatment Chemical Co., Clariant Phasetreat 4688 by Clariant, or any other suitable demulsifier.

Proper identification and design of the interface layer is advantageous for the successful application of embodiments of the disclosure. In some embodiments, a rag layer is withdrawn based on the pressure differential available between the desalters/dehydrators and the LPDT. Inlet pressure to a RO or LIC/control valve at a dehydrator or desalter can be more than about 150 psig, while the downstream pressure is less than about 15 psig, for example at a LPDT. In this example, there is more than about 135 psig differential pressure to control the flow throw a RO or LIC/control valve combination. A RO will be sized based on the pressure drop available and the flow rate range required for a slip stream of the rag layer. For the LIC/control valve combination, a flow controller to control the flow can be included. For instance, if insulated electrostatic electrodes sensed or detected about 100% water withdrawal, flow from an oily water interface layer could be stopped, and the water level in a dehydrator or desalter could be lowered by releasing more water from the vessel.

Referring now generally to FIGS. 1-4, wet crude oil from oil production wells enters production separators (also referred to as production traps) preceding a wet dry heat exchanger, such as wet dry crude oil heat exchanger 104, and the wet crude oil undergoes an initial three-phase water, oil, gas separation to remove most of the gasses and free-formation water. The operating conditions in the production separators ranges from about 65° F. to about 130° F. and about 50 psig to about 450 psig.

The initially-treated wet crude oil stream from the production separators is passed to a wet dry crude heat exchanger, such as wet dry crude oil heat exchanger 104, to recover heat from a stabilizer product bottom stream, such as for example dry crude product bottom stream 191 shown in FIG. 1, and to reheat the oil/water/gas mixture to above 85° F. to enhance water separation in a LPDT, for example LPDT 106. Heated crude oil from wet dry crude oil heat exchanger 104 is passed to the three-phase separator LPDT 106 where pressure is reduced to about 3 psig, so that the last heavy gas components can boil out and be removed via off-gas stream 108. Operating conditions in LPDT's range from about 65° F. to about 130° F. and about 3 psig to about 5 psig.

Wet crude oil in crude oil outlet stream 110 from LPDT 106 is pumped through crude charge pumps 116 and is conveyed to a trim heat exchanger 118 to increase the temperature of the crude oil to above 150° F., and then crude oil is passed to dehydrator 122 for further water/oil separation. Heating wet crude oil enhances the efficiency of dehydrator 122 and increases desalting efficiency of first stage desalter 150 and second stage desalter 174. Heat exchangers can be a tube/shell type where wet crude oil passes though tubes and the heating medium is placed inside an outer shell.

Heated crude oil from the trim heat exchanger 118 is passed to mixing valve 120 to mix in recycle wash water from recycled wash water line 166 from first stage desalter 150 before entering dehydrator 122. Mixing valve differential pressure ranges from about 10 psig to about 30 psig. Dehydrator 122 is a horizontal vessel where a certain amount of drying the wet crude oil occurs. Washing and electrostatic coalescence takes place in dehydrator 122. The wet crude oil input to dehydrator 122 still contains some free salty water, and salty water in the form of an emulsion in the oil. The emulsion is separated into layers of oil and water by electrostatic coalescence. Electrostatic coalescence uses an electric current, causing the water droplets in the emulsion to collide, coalesce into larger (heavier) drops, and settle out of the crude oil. This process partially dries the wet crude oil. Oily water proceeds to water treatment unit 140 by water outlet 144. Partially-dried crude oil, still containing some salty water in emulsion, goes to the first stage desalter 150. The operating temperature of the dehydrator ranges from about 130° F. to about 160° F., and the pressure in dehydrator 122 is about 25 psig above the crude oil vapor pressure.

In dehydrator 122, an emulsion layer (rag layer) is formed between liquid oil and water, due several factors including the naturally occurring emulsifying agents in the crude oil, total suspended solids in crude or formation water, low operating and low seasonal crude arrival temperature, and the type of demulsifier used. Conventionally, the control of the rag layer is performed manually by increasing the demulsifier injection dosage and opening skimming valves. However, due to a lack of reliable interface level measurement, operators have needed to visually determine if the withdrawn phase is oil or water or if it is a stable emulsion phase (rag layer). In embodiments of systems and methods here, a RO can be sized based on the pressure drop available from a high pressure vessel to a low pressure vessel, and the flow rate range desired for withdrawal from a rag layer via a slip stream. For a LIC/control valve combination, optionally in addition to or alternative to a flow indicator and controller, flow can increase when a rag layer is detected (insulated electrostatic electrodes not sensing/detecting about 100% water), and a flow controller can decrease or stop flow withdrawal from a rag layer if about 100% water is detected at insulated electrostatic electrodes.

Partially-dried crude oil from dehydrator 122 is mixed with recycled effluent water from recycled wash water stream 152 from the second stage desalter 174 in mixing valve 148. Effluent water from first stage desalter 150 is conveyed to dehydrator 122. The operating temperature of the first stage desalter ranges from about 130° F. to about 160° F., and the pressure is to be about 25 psig above the crude oil vapor pressure.

In first stage desalter 150, an emulsion layer (rag layer) is formed between liquid oil and water, due several factors including the naturally occurring emulsifying agents in the crude, total suspended solids in crude or formation water, low operating and low seasonal crude arrival temperature, and the type of demulsifier used. Conventionally, control of the rag layer is performed manually by increasing the demulsifier injection dosage and opening skimming valves. Due to the lack of reliable interface level measurement, operators have needed to visually determine if the withdrawn phase is oil or water or if it is a stable emulsion phase (rag layer).

Second stage desalter 174 can be one of the final stages of wet crude oil processing in a GOSP. Partially dried crude oil is conveyed to second stage desalter 174 from first stage desalter 150. Fresh wash water (lower in salt concentration than the crude oil) is injected into the inlet of the second stage desalter mixing valve 172. Low salinity wash water rinses remaining salt from the crude oil. Fresh wash water is used in the desalter process to ensure that the maximum amount of salt is rinsed from the wet crude oil. Electrostatic coalescence removes the remaining water emulsion from the wet crude oil in the same way as the dehydrator 122 and first stage desalter 150. Effluent water from second stage desalter 174 is conveyed to the first stage desalter 150. The output from second stage desalter 174 is dry crude oil that passes to the depressurizing valve 186 and then to the crude oil stabilizer 188. The operating temperature of the second stage desalter ranges from about 130° F. to about 160° F., and the operating pressure is at least about 25 psig above the crude oil vapor pressure.

In second stage desalter 174, an emulsion layer (rag layer) is formed between liquid oil and water, due several factors including the naturally occurring emulsifying agents in the crude, total suspended solids in crude or formation water, low operating and low seasonal crude arrival temperature, and the type of demulsifier used. Conventionally, control of the rag layer has been performed manually by increasing demulsifier injection dosage and by opening skimming valves. Due to the lack of reliable interface level measurement, operators have visually determined in the past if the withdrawn phase is oil or water or if it is stable emulsion phase (rag layer).

Water treatment unit 140 collects water from streams from dehydrators, LPDT's, LPPT's, and any HPPT's, and separates oil from the collected water. Wastewater is discharged to disposal water wells and extracted oil is conveyed to the LPDT, such as LPDT 106.

Referring now to FIG. 5, a flow diagram is provided showing an example embodiment for treatment of a rag layer from a desalter. In system 500, crude oil inlet stream 502 is mixed with fresh water from fresh water stream 504 in mixing valve 506, before entering a desalter 508. Treated crude oil exits desalter 508 by stream 510, and proximate an oily water interface skimmer 512, a rag layer stream 514 is withdrawn through RO 516 to a turbocharger 518. Water stream 520 from the bottom of desalter 508 is also conveyed to turbocharger 518. Turbocharger 518 is used to boost the pressure of the emulsion slip stream (recycled rag layer or oily water emulsion) before being fed to a spool of pipe fitted with fully insulated electrostatic electrodes 522. The electrodes can be programmed to be 100% deactivated when the incoming stream 524 is 100% water. The treated rag layer from the pipe fitted with fully insulated electrostatic electrodes 522 is recycled via stream 526 back to desalter 508 to be mixed with crude oil.

For the embodiment of FIG. 5, this is one method to apply in refineries in which there is no low pressure storage tank(s) available prior to the desalters, for example. A turbocharger is installed to restore the energy (pressure) to the water stream 520 and to boost the rag layer stream 514 for recycling it back to the desalter 508 inlet at higher pressure.

Notably, the layout of the turbocharger treatment shown in FIG. 5 could be applied in a variety of configurations to the dehydrators, in addition to or alternative to the desalters shown in FIGS. 1-4 and explained previously.

Referring now to FIG. 6, a flow diagram is provided showing an example embodiment for treatment of a rag layer from a LPDT. In system 600, crude oil inlet stream 602 proceeds through valve 604 before entering LPDT 606. Hydrocarbon gases exit LPDT by off-gas stream 608, and treated crude oil proceeds to desalters via outlet stream 610. An oily water interface skimmer 612 allows a recycled rag layer (oily water emulsion) 614 to proceed out of LPDT 606 and through RO 616, after which it is recycled by recycle pump 618 to a pipe fitted with fully insulated electrostatic electrodes 620. Treated oily water emulsion (rag layer) returns to LPDT 606 by recycle stream 622. Oily water exits the bottom of LPDT 606 by stream 624.

The electrodes can be programmed to be 100% deactivated when the incoming stream 623 is 100% water. The treated rag layer from the pipe fitted with fully insulated electrostatic electrodes 620 is recycled via stream 622 back to LPDT 606 to be mixed with crude oil. The embodiment of FIG. 6 shows one system and method for breaking an emulsion in about atmospheric pressure wet crude oil storage tanks. A RO can be used to control the flow, in addition to or alternative to a LIC/FIC/control valve combination. One objective of the pressure boosting in FIGS. 5 and 6 is to provide enough head to recycle the flow back to the tank inlets for recycle.

Notably, the layout of the LPDT shown in FIG. 6 could be applied in a variety of configurations to the LPDT's shown in FIGS. 1-4 and explained previously.

Proper design of the interface layer location and the electrostatic grids in the conventional desalters are advantageous for the successful application of the invention. Manually recycling a rag layer to an LPDT succeeds in the short term, but the rag layer is being recirculated and will eventually accumulate again and cause operation interruption. Treating the rag layer will permanently resolve the emulsion issue, such as disclosed herein with insulated electrostatic electrodes.

What is claimed is:

1. A system for treating a rag layer in a gas oil separation plant process, the system comprising:
   an outlet stream to withdraw the rag layer from a first vessel proximate an oil water interface;
   a separation device, the separation device in fluid communication with the outlet stream and operable to effect electrostatic coalescence on the rag layer to separate oil and water; and
   a recycle line to recycle separated oil from the separation device back to a second vessel of the gas oil separation plant process,
   where the system is operable to open a water level control valve on the outlet stream in response to a deactivation signal from the separation device to reduce a water level in the first vessel to below an oily water interface skimmer such that the oil water interface is proximate the oily water interface skimmer, and
   where the system is operable to withdraw the rag layer in part based on a pressure differential between a pressure in the first vessel and a pressure in the second vessel, the pressure in the first vessel being greater than the pressure in the second vessel.

2. The system according to claim 1, where the first vessel is selected from the group consisting of: a dehydrator and a desalter.

3. The system according to claim 2, wherein the second vessel comprises a low pressure production trap; and further comprises a third vessel selected from the group consisting of a dehydrator and a desalter and is different from the first vessel; and where a hydrocarbon inlet stream to the low pressure production trap and a hydrocarbon inlet stream to the dehydrator are heated by heat exchangers to increase efficiency of water/oil separation in the system.

4. The system according to claim 1, where the separation device is selected from the group consisting of: a three-phase separation device equipped with fully insulated electrostatic electrodes and a spool of pipe equipped with fully insulated electrostatic electrodes.

5. The system according to claim 1, further comprising a level indicator and controller in communication with the vessel and in communication with a control valve, the control valve in fluid communication with the vessel via the outlet stream.

6. The system according to claim 1, the system operable to automatically discontinue conveying the rag layer to the separation device when the separation device detects 100% water being withdrawn from the vessel.

7. The system according to claim 1, further comprising a device to increase the pressure of the rag layer.

8. The system according to claim 7, where the device to increase the pressure of the rag layer is selected from the group consisting of: a turbocharger; a pump; and combinations of the same.

* * * * *